T. B. Doolittle,

Fruit Box.

No. 3425

Reissued May 4, 1869.

Diagram 1

Witnesses.

Chas. A. Scott.

Frederick A. Sayer

Inventor.

T. B. Doolittle.

assgd. W.

Ann. Barfat &c by J. Lindsay

J. C. Mitchell

Atty.

UNITED STATES PATENT OFFICE.

AMERICAN BASKET COMPANY, OF NEW BRITAIN, AND T. B. SMITH, OF ANSONIA, ASSIGNEES, BY MESNE ASSIGNMENTS, OF T. B. DOOLITTLE, OF ANSONIA, CONNECTICUT.

IMPROVEMENT IN FRUIT-BOXES.

Specification forming part of Letters Patent No. 55,631, dated June 19, 1866; Reissue No. 3,425, dated May 4, 1869.

*To all whom it may concern:*

Be it known that T. B. DOOLITTLE, of Ansonia, in the county of New Haven and State of Connecticut, has invented certain new and useful Improvements in the Manufacture of Wooden Boxes, of which the following is a full, clear, and exact description, reference being had to the accompanying drawings, making part of this specification.

This invention relates more particularly to that kind of wooden boxes which is intended for packing small quantities of material—such as fruit, lard, &c.—and has for its main objects to provide a box which shall be economic of manufacture, combine sufficient strength with very little weight of stock, and the parts of which can be manufactured, conveniently packed, and sold to farmers and others, and require little or no mechanical skill, and the use of merely a hammer and tacks in the putting together, while at the same time as a whole it shall be convenient and desirable for the purposes for which it may be intended; and to these ends this invention consists in a wooden box formed of two end boards or blocks of sufficient thickness to receive the nails, in combination with a veneer (or thin board) cut partially when it is to form angles of the box, and bent around and secured to the said end blocks, all as hereinafter fully described; and this invention further consists in making the veneer or thin board, which is bent round to form the top, bottom, and sides of the box, so as to extend over on the front side of the box and constitute a flap for the more efficient and ready fastening down of the top or lid, as will be hereinafter more fully described; and this invention further consists in the employment, in combination with the veneer or thin wood which is bent round to form the sides of the box, of a post or rib, to facilitate the nailing fast or securing of the lid, as will be hereinafter more fully explained.

Figure 1:
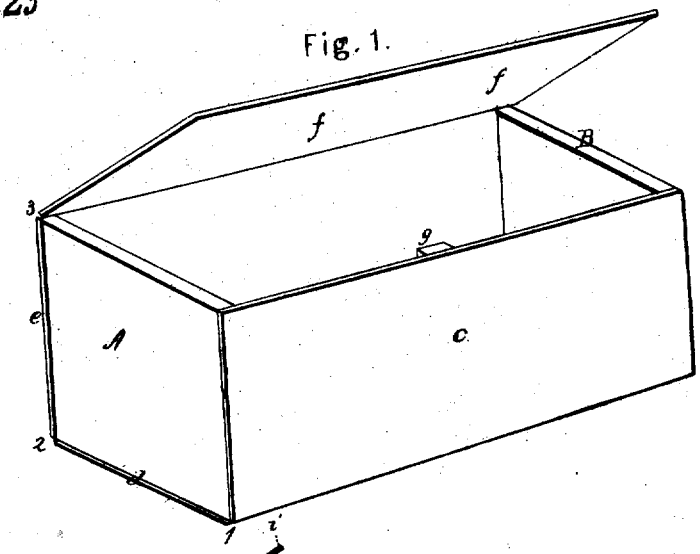
Figure 2:
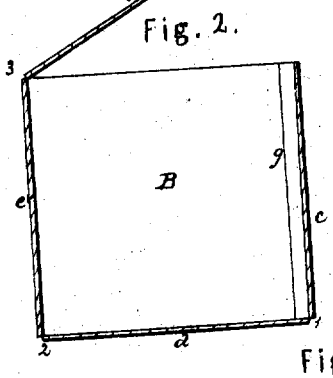
Figure 2:
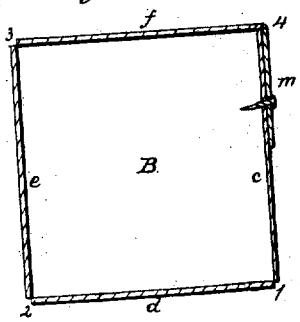
Figure 3:
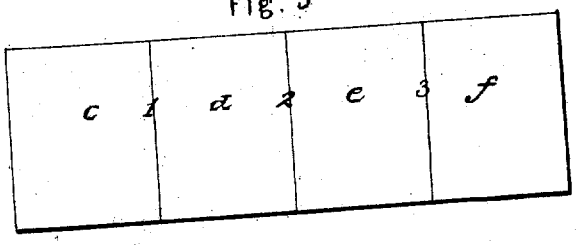

In the accompanying drawings, forming part of this specification, Figure 1 is a perspective view of a box made according to this invention. Fig. 2 is a cross-section of the same at the line *x x* of Fig. 1, and Fig. 3 is a plan view of the veneer of which the sides of the box are formed.

In the several figures the same letters denote the same parts.

A and B are the two ends of the box, which are made of about the shape shown, (but which may of course be varied in shape and proportions.) These ends A and B should be made sufficiently thick to properly receive and retain the nails by which the veneer of which the sides are formed is secured to them. The bottom, sides, and top of the box are all formed of a single thin board or veneer, such as seen at Fig. 3. This board is partially cut crosswise and across the grain in parallel lines, as indicated at 1 2 3, and it is then bent around the two ends A and B, and secured to them in such manner that the portion *c* shall constitute the front, *d* the bottom, *e* the back, and *f* the top or lid of the box. The portions *c*, *d*, and *e* are permanently nailed or otherwise fastened to the ends A B, and the portion *f* is left to be secured after the box is packed or filled, the cut 3 forming or constituting a hinge for the lid portion *f*. When it is desired to secure the lid *f*, it may be easily nailed or tacked at each end near its forward or front edge to the end pieces, A B; but since the material of the front side, C, is not thick enough to receive a nail, and it is necessary to secure the lid *f* near the middle of its front edge, it is proposed to rivet or otherwise secure to the front portion, *c*, on its inner surface, near the middle, a vertical strip or post, *g*, of a suitable wood, and sufficiently thick to receive and firmly hold an ordinary brad or nail driven in from the lid *f*.

It will be seen that by forming a box in the manner shown and described there are fewer joints to open; that less nailing or securing is necessary; that the parts may be economically manufactured and packed for transportation and be readily put together by any person not skilled in the use of tools; and it will also be seen that a hinged lid (which is a great desideratum) is virtually provided (without the use or appliance of hinges) by the method of slitting or cutting the piece of veneer, which is bent round in the manner described.

At diagram 1 in the drawings the second part of the invention is more particularly illustrated. The veneer which forms the sides of the box is here represented as being made sufficiently long and so cut (in four places) as to provide a flap, *m*, which extends down partially over the front *c* of the box, and which may be secured by nails passing through it (and the front *c*) into the end blocks, A B. If deemed expedient, the flap *m* may be also secured (either permanently or temporarily) to the post *g* by a tack (passing through the front *c*) into it, or in any other manner.

It will be understood that, when either the flap *m* be used or not, the post *g* affords a means for securely nailing down the lid *f* near the middle of its front edge, which may be very desirable, and which, owing to the front *c* being of too thin material to nail into, could not, without some such means, be accomplished. Of course the different parts or features of the herein-described invention may be used separately with more or less advantage in the manufacture of wooden boxes for different uses.

Having fully described the several features of the invention, what is claimed therein as new, and desired to be secured by Letters Patent, is—

The manufacture of wooden boxes composed of end pieces of sufficient thickness of stock to receive and hold the nails, in combination with a veneer partially cut crosswise and bent around and secured to said end pieces, all substantially as described.

AMERICAN BASKET CO.,
By B. N. CORNING.

Witnesses:
D. S. OSBORN,
L. B. WILCOX.

T. B. SMITH. [L. S.]

Witnesses:
CHAS. A. SCOTT,
FREDERIC A. SAYN.